(12) United States Patent
Nguyen et al.

(10) Patent No.: US 6,941,991 B2
(45) Date of Patent: Sep. 13, 2005

(54) RADIAL TIRE WITH IMPROVED PLY LINE

(75) Inventors: Gia Van Nguyen, Rossignol (BE); Marco Joseph Eicher, Schrondweiler (LU); Alain Alphonse Zelie Samuel Klepper, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 211 days.

(21) Appl. No.: 10/348,261

(22) Filed: Jan. 22, 2003

(65) Prior Publication Data

US 2003/0136493 A1 Jul. 24, 2003

Related U.S. Application Data

(63) Continuation-in-part of application No. 09/494,849, filed on Feb. 1, 2000, now abandoned.

(51) Int. Cl.$^7$ ................................................. B60C 3/00
(52) U.S. Cl. ..................................... 152/454; 152/209.1
(58) Field of Search ................................ 152/209.1, 454

(56) References Cited

U.S. PATENT DOCUMENTS

| | | |
|---|---|---|
| 3,782,438 A | 1/1974 | Mirtain |
| 3,789,898 A | 2/1974 | Montagne |
| 3,916,968 A | 11/1975 | Masson |
| 3,931,844 A | 1/1976 | Mirtain |
| 3,961,657 A | 6/1976 | Chrobak |
| 4,055,209 A | 10/1977 | Senger |
| 4,170,254 A | 10/1979 | Jackson |
| 4,307,767 A | 12/1981 | Calori |
| 4,724,878 A | 2/1988 | Kabe et al. |
| 4,741,373 A | 5/1988 | Mauk |
| 4,794,968 A | 1/1989 | Griffiths et al. |
| 4,955,416 A | 9/1990 | Takeuchi et al. |
| 5,000,239 A | 3/1991 | Brayer et al. |
| 5,014,761 A | 5/1991 | Noma et al. |
| 5,097,882 A | 3/1992 | Adam et al. |
| 5,115,849 A | 5/1992 | Corner |
| 5,277,727 A | 1/1994 | Seiler et al. |
| 5,323,825 A | 6/1994 | Yamagishi et al. |
| 5,353,856 A | 10/1994 | Kishi et al. |
| 5,360,044 A | 11/1994 | Saito et al. |
| 5,361,815 A | 11/1994 | Loser et al. |
| 5,503,206 A | 4/1996 | Consolacion et al. |
| 5,522,442 A | 6/1996 | Kishi |
| 5,637,162 A | 6/1997 | Rhyne et al. |
| 5,660,652 A | 8/1997 | Young et al. |
| 5,735,979 A | 4/1998 | Secondari |
| 6,408,909 B1 | 6/2002 | Nguyen |

FOREIGN PATENT DOCUMENTS

| | | | |
|---|---|---|---|
| EP | 0311291 | | 4/1989 |
| EP | 0477542 | | 4/1992 |
| EP | 0658450 | * | 6/1995 |
| JP | 61157402 | | 7/1986 |
| JP | 08142602 | | 6/1996 |

* cited by examiner

*Primary Examiner*—Jeff H. Aftergut
*Assistant Examiner*—Justin Fischer
(74) *Attorney, Agent, or Firm*—Howard M. Cohn

(57) ABSTRACT

A radial ply, passenger vehicle tire has a tread with a substantially flat tread profile, a belt structure, and a carcass comprising two sidewalls, two beads and one or more plies. The one or more plies have a loaded shoulder ply radius that is smaller than the tire's unloaded shoulder ply radius. This design eliminates tread-lift and eliminates the need for decoupling grooves in the shoulder regions of the tread.

4 Claims, 8 Drawing Sheets

RADIAL TIRE WITH IMPROVED PLY LINE

RELATED APPLICATIONS

This application is a continuation-in-part application of U.S. patent application Ser. No. 09/494,849 having a filing date of Feb. 1, 2000 now abandoned and a common assignee with the present invention.

TECHNICAL FIELD

The present invention relates to an improved radial ply tire, and more specifically to an improved ply line of a radial ply passenger or light truck tire.

BACKGROUND OF THE INVENTION

It is desirable for a tire tread to bear against the ground uniformly along its width, so that the load on the tire is evenly distributed. When a tire is loaded, the portion of the tire's sidewalls near the ground bulge outward. If the tire is stiff along the shoulders, the sidewall bulge causes the center of the tread in contact with the ground to lift off the ground or merely to lose pressure against the ground. The stiff tire sidewall close to the shoulder acts like a lever, and the shoulder against the ground acts as its fulcrum. This "tread-lift" is aggravated by high bending stiffness of the shoulder area, and by a small ply line radius (i.e. sharp bend) in the shoulder.

The resulting bending stresses from the sidewalls to the tread causes inward buckling and lifting of the center portion of the tread off the ground, causing the center portion of the tread to bear little or none of the tire's load, which produces several problems. It degrades vehicle handling characteristics, especially in cornering. It increases tread wear near the shoulders and increases material fatigue under the tread due to the cycling of the bending stresses, and hence shortens tire life. Tread-lift is a problem whether the tread center actually lifts off the ground or merely loses pressure against the ground.

"Heavy handling" refers to severe driving conditions due to aggressive driving by a driver, such as sharp cornering and racing conditions. For good heavy handling performance, the tire shoulder area needs to have heavier gauge (i.e. thicker) rubber in the tire shoulder and upper sidewall areas. This is required to provide a high tangential stiffness (i.e. resistance of tread rotation around tire axis relative to the beads) and a better durability in heavy handling. However, a heavy gauge leads to high bending stiffness especially in the shoulder area where the ply line radius is rather small. Hence, heavy handling tires are prone to tread-lift.

PCT application PCT/US98/00717, filed Jan. 15, 1998, and having a common assignee with the present invention, discloses a way of alleviating the tread-lift problem by including "decoupling grooves" in the tread in the tire shoulders, and by increasing the radii of the adjacent contour-defining curves near the shoulder, and also by rendering the adjacent contour-defining curves not tangent with each other at their meeting point. While alleviating the tread-lift problem, incorporating decoupling grooves in the shoulders has the problems of reduced tangential stiffness and reduced tire integrity (durability) in heavy handling.

U.S. Pat. No. 5,014,761 discloses a "radial tire for motorcycle in which the steering stability at high running speed is improved and the ply separation at the breaker edges is lessened." The disclosure of the '761 patent can be distinguished from the passenger tire of the present invention because the former relates specifically to a radial motorcycle tire which has its own special characteristics as stated in the '761 patent. These differences include "the radius of curvature of the tread is small, that is, the tread is round." This can be understood because a motorcycle tire has an essentially round tread profile, loaded and unloaded. Of course, it flattens out a bit under load. The essentially round tread profile is because the motorcycle has to turn by leaning over (at anything higher than parking lot speeds). The tread has to have a round profile to allow for such leaning, which can easily exceed 30 degrees from vertical. A flat, 'squarish' tread profile will not allow this type of turning and will actually resist leaning. Passenger cars, by contrast, do not turn this way. The suspension system of an automobile is designed to resist leaning. The tread profile of a passenger tire is essentially flat. Cars turn, at all speeds, by turning at least the front tires (in some exotic vehicles, the back wheels turn too). The passenger tires have flat/square profiles to ensure contact all the time.

SUMMARY OF THE INVENTION

According to the invention, a radial ply, passenger vehicle tire has a tread with a substantially flat tread profile, a belt structure, and a carcass comprising two sidewalls, two beads and one or more plies. The one or more plies have a loaded shoulder ply radius (ply line in the shoulder area when the tire is loaded and at its rated pressure) that is smaller than the tire's unloaded shoulder ply radius (ply line in the shoulder area when the tire is unloaded). This design eliminates tread-lift and eliminates the need for decoupling grooves in the shoulder regions of the tread. The loaded shoulder ply radius is 20% to 80% shorter, and preferably 40% to 60% shorter, than the unloaded shoulder ply radius.

More specifically, according to the invention, the tire is free of decoupling grooves in the tread at a distance of about 5 mm to about 30 mm from the shoulders.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in some of the drawings may be illustrated not-to-scale for illustrative clarity.

In the drawings, the hundredth's place of each reference number usually matches the figure number, and similar elements are usually referred to by similar reference numbers. For example, element 199 in FIG. 1 and element 299 in FIG. 2 might indicate corresponding or substantially similar elements.

The same element appearing in different figures is usually given the same reference number in all figures.

In a single drawing, similar elements may be assigned the same number, and may be distinguished from each other by a letter suffix.

For illustrative clarity, the cross-sectional views presented herein may be in the form "near-sighted" cross-sectional views, omitting certain background lines that would otherwise be visible in a true cross-sectional view.

Figure 1A:
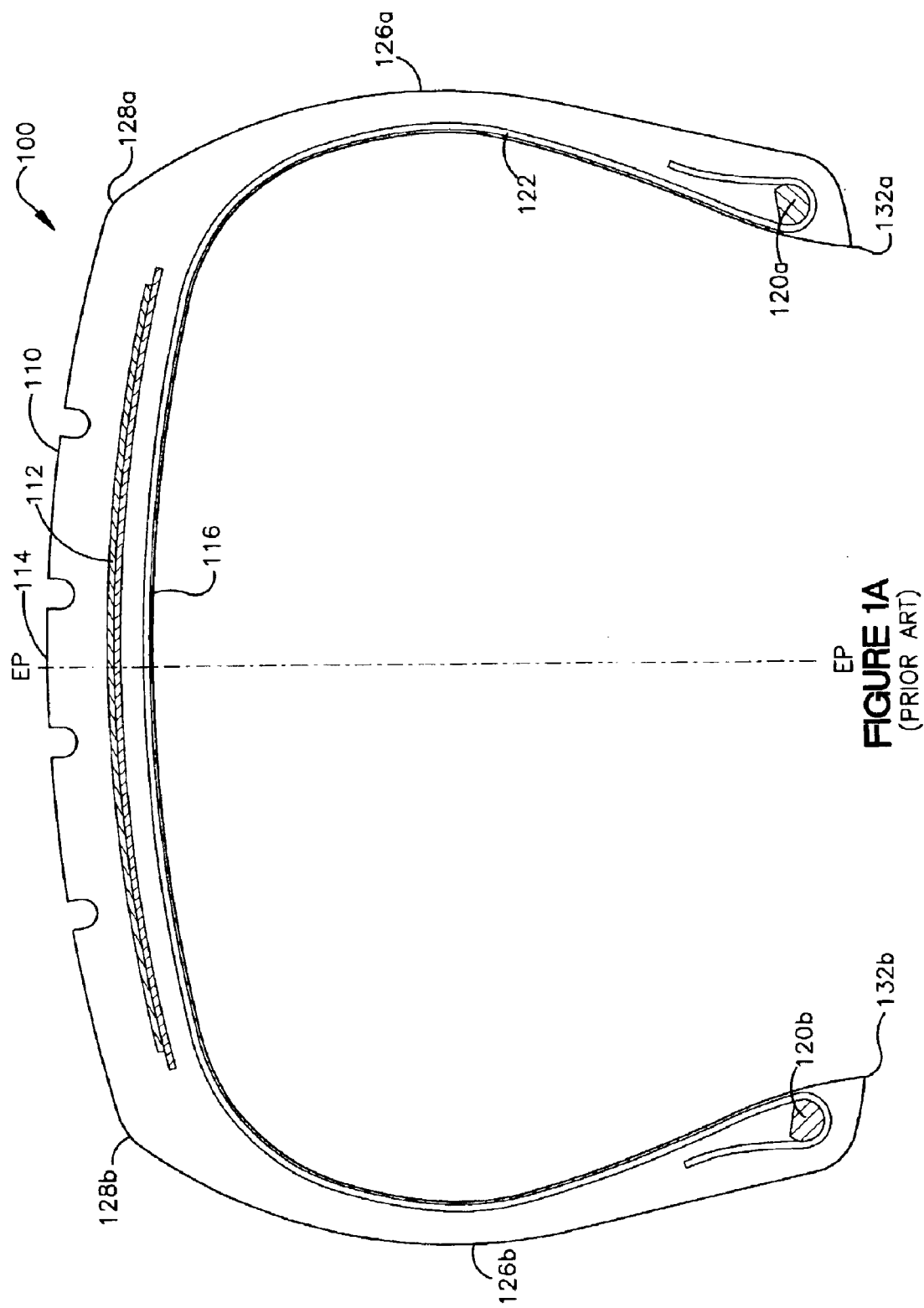
Figure 1B:
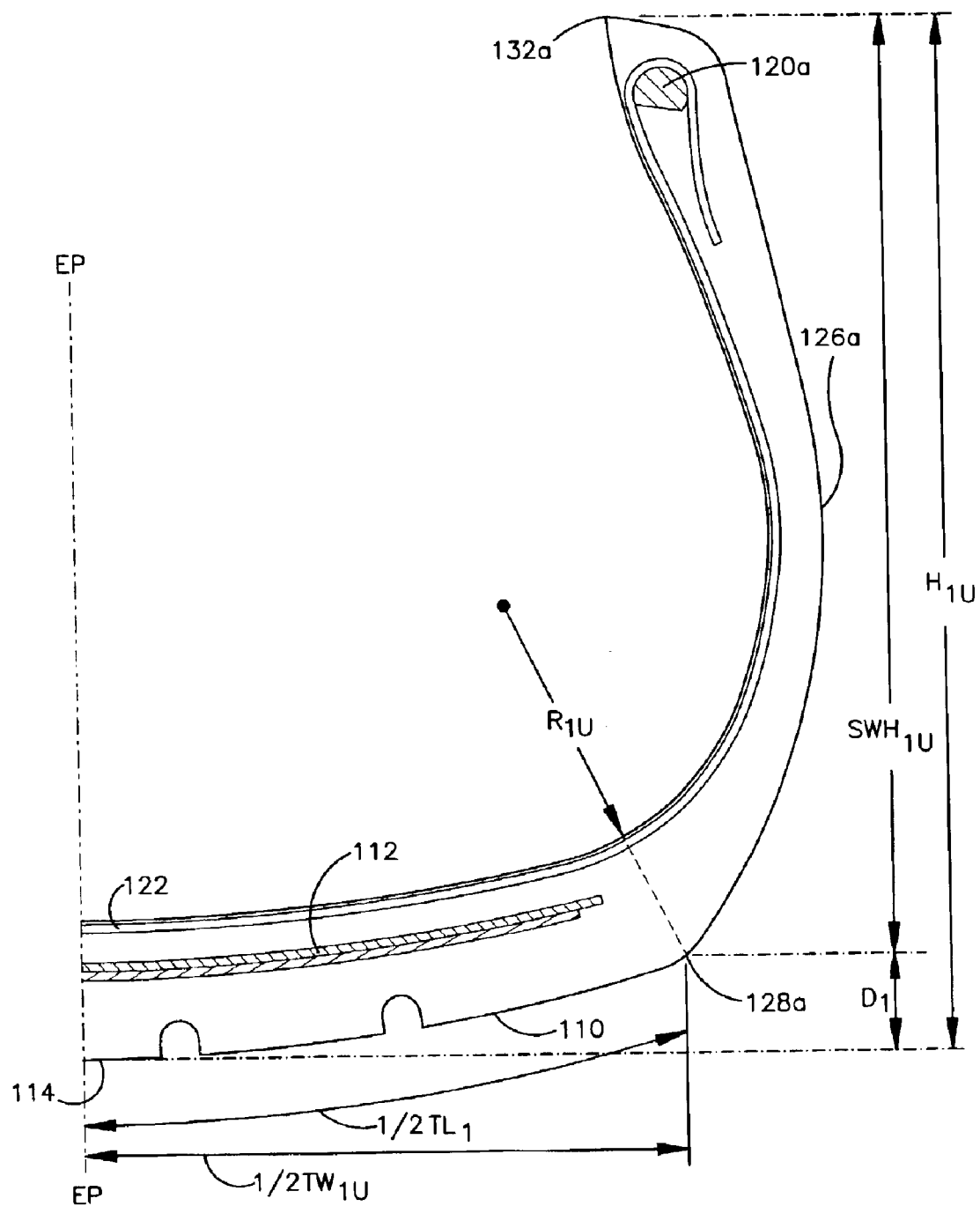
Figure 1C:
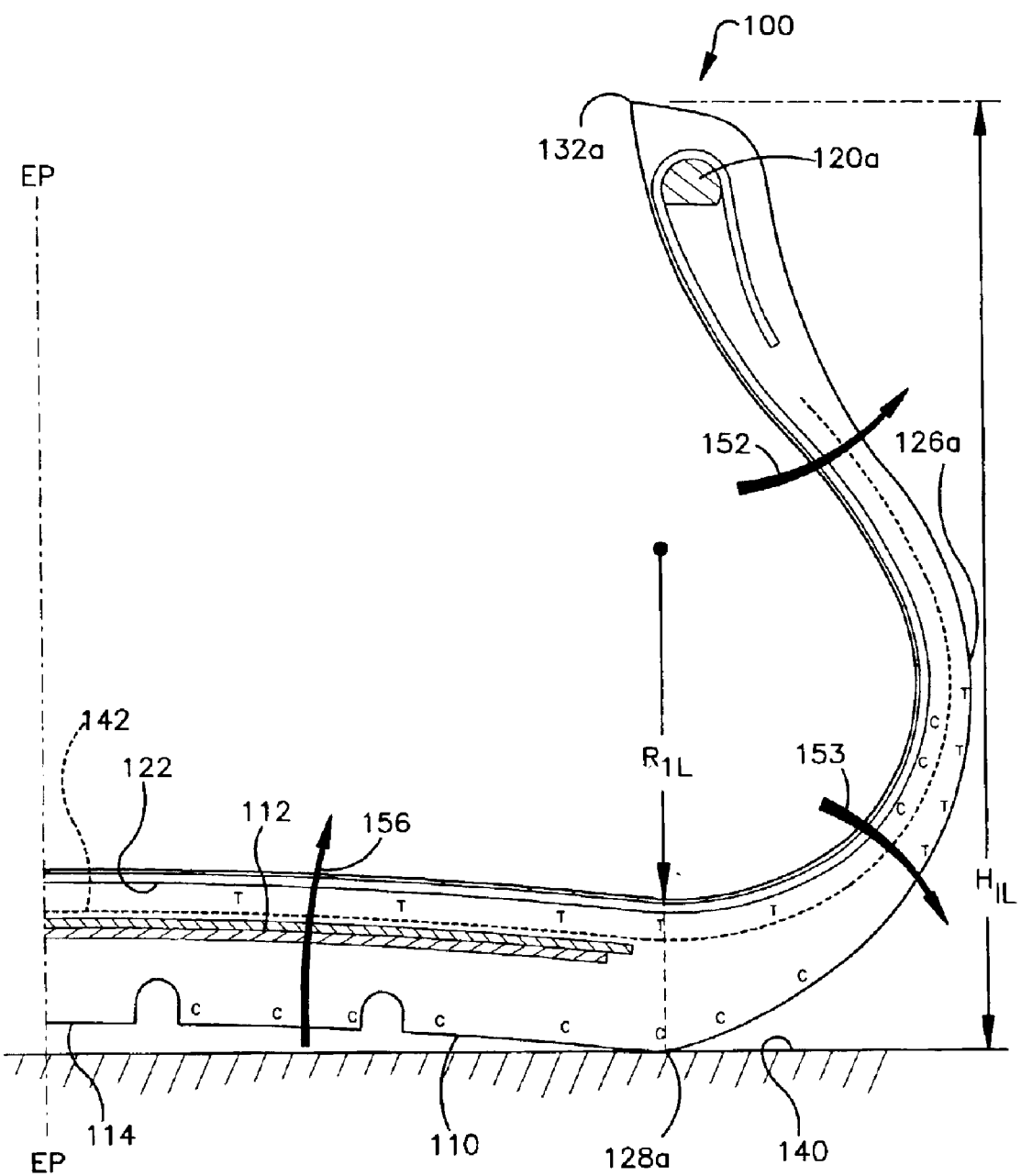
Figure 1D:
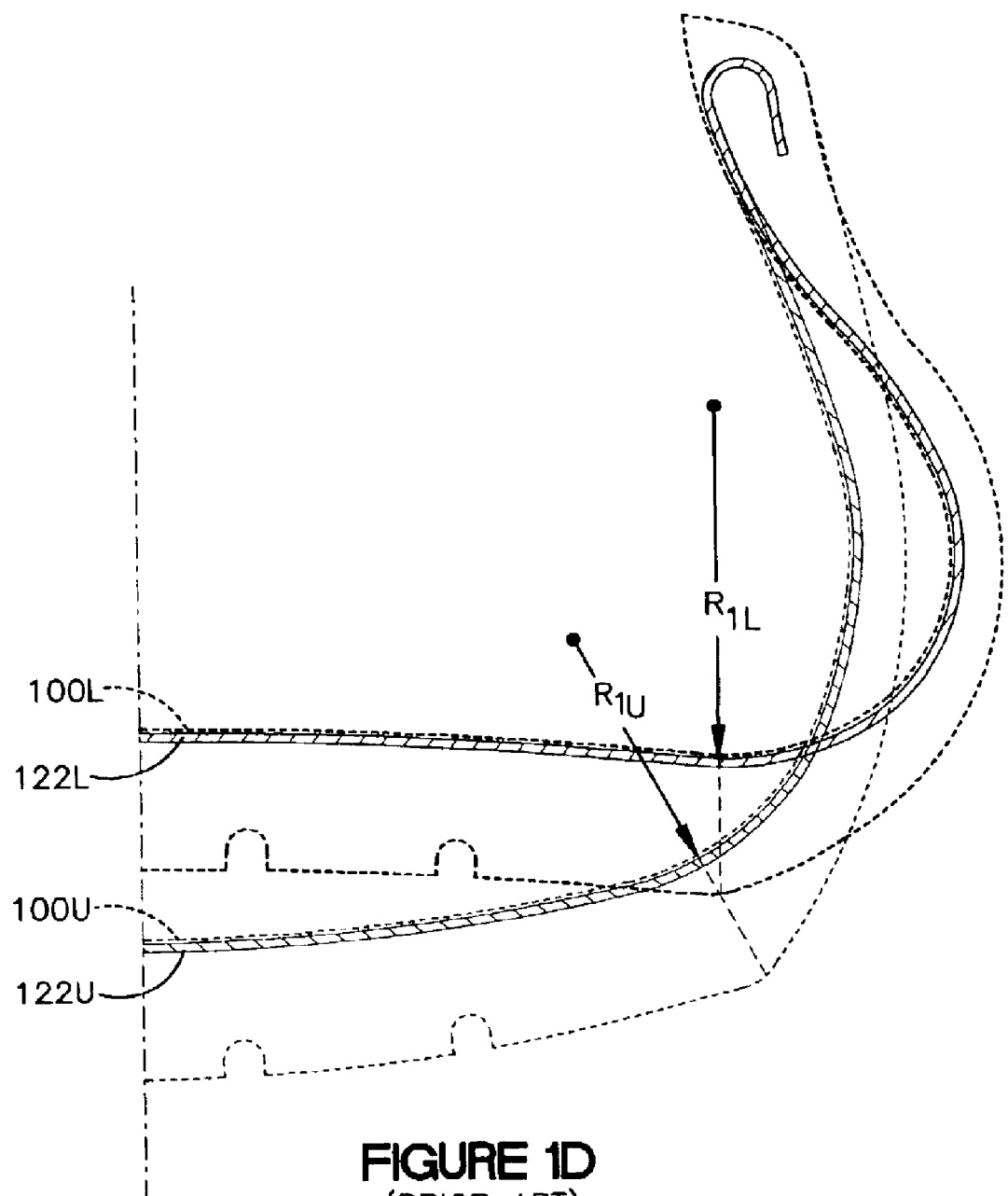
Figure 2A:
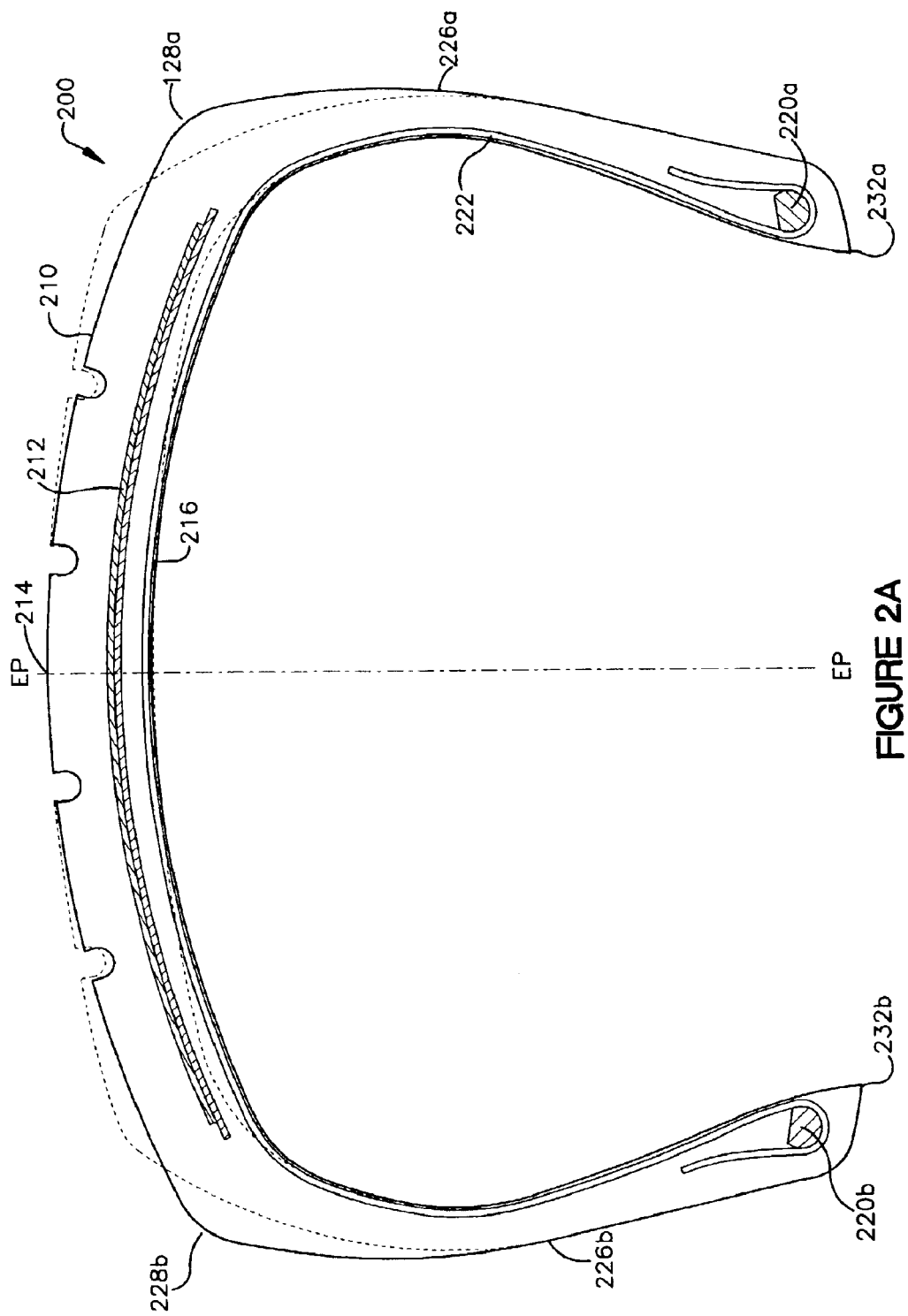

The structure, operation, and advantages of the invention will become further apparent upon consideration of the following description taken in conjunction with the accompanying drawings, wherein:

FIG. 1A shows a meridional cross-section of a prior art pneumatic radial ply tire, showing its profile as it would be when inflated but not resting on a road surface (unloaded);

FIG. 1B shows a meridional cross-section of a portion of the tire of FIG. 1A, showing various dimensions, when inflated and unloaded;

FIG. 1C shows a meridional cross-section of a portion of the tire of FIG. 1A, showing various dimensions, when inflated and loaded;

FIG. 1D show a meridional cross-section of a portion of the tire of FIG. 1A, showing the ply line and the tire outline as they would be both when loaded and when unloaded;

FIG. 2A shows a meridional cross-section of the pneumatic radial ply tire according to the present invention, showing its profile as it would be when inflated but unloaded.

Figure 2B:
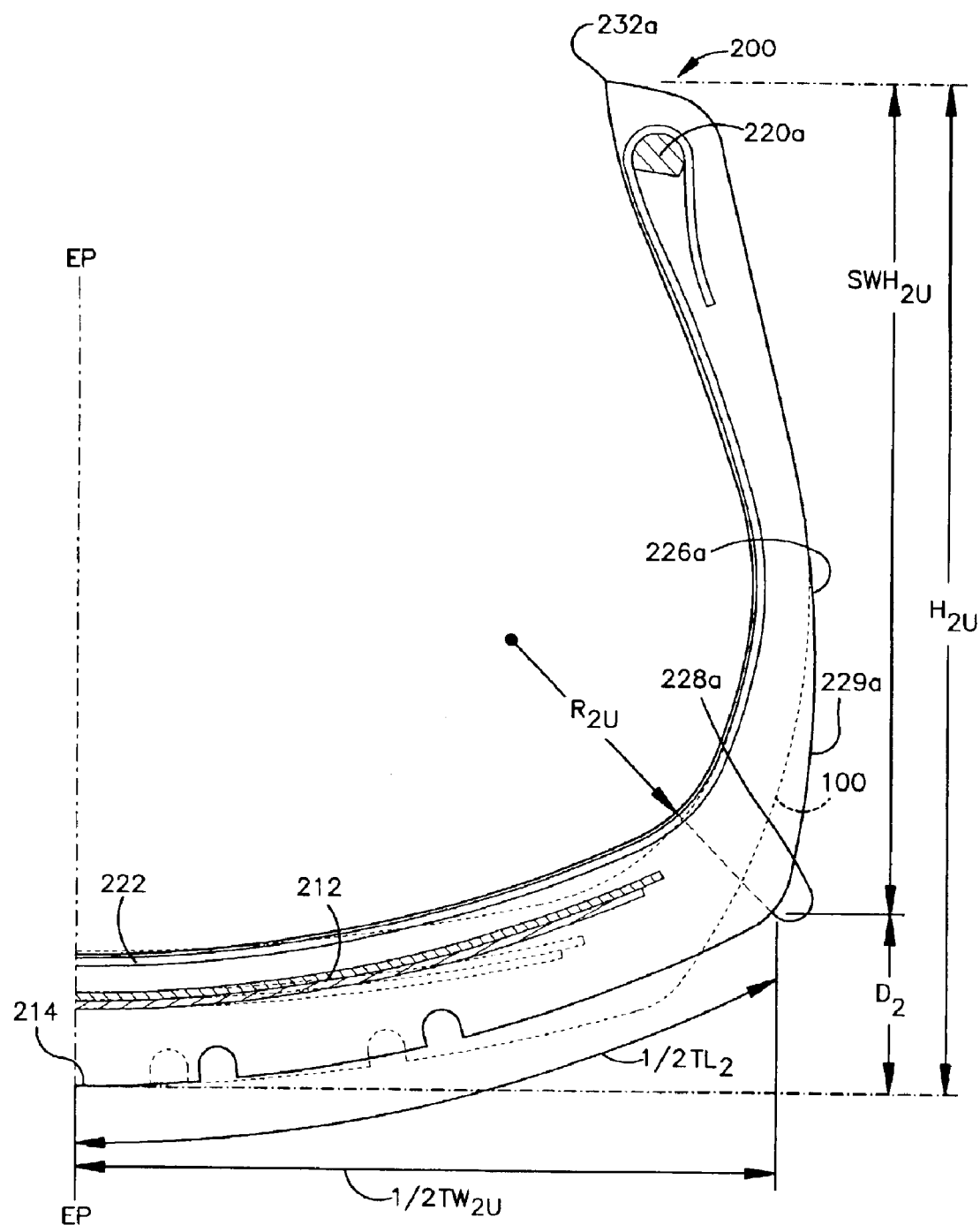
Figure 2C:
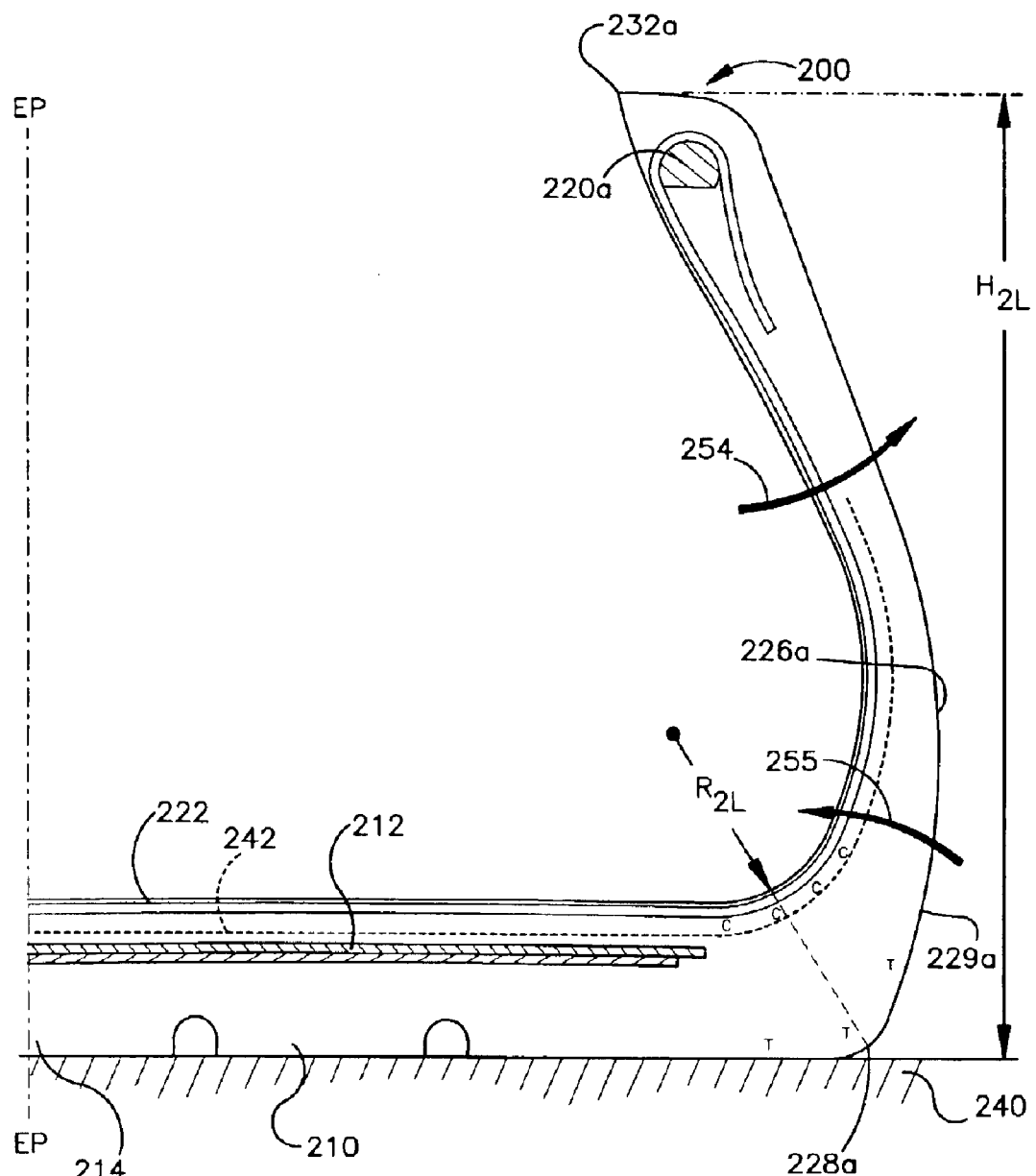
Figure 2D:
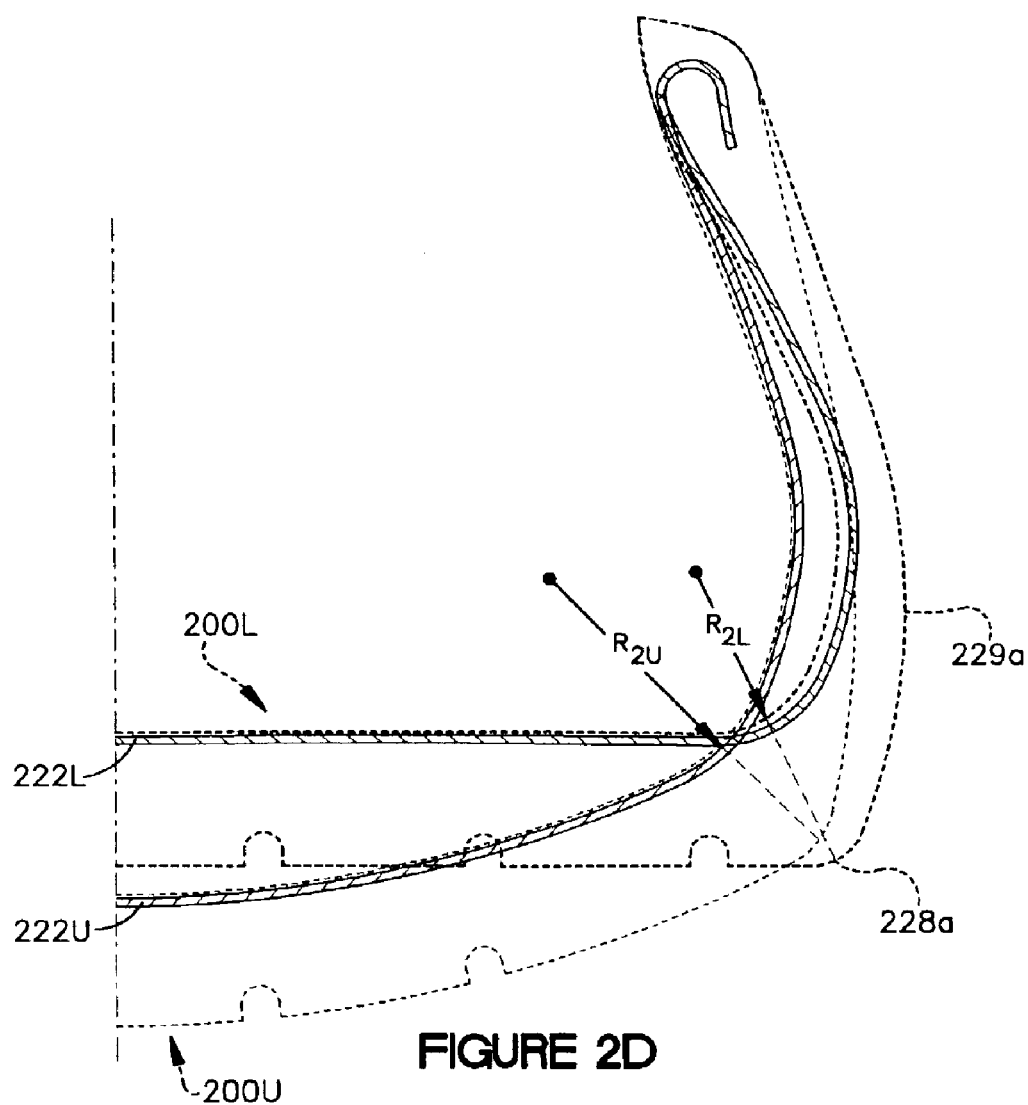
Figure 3:
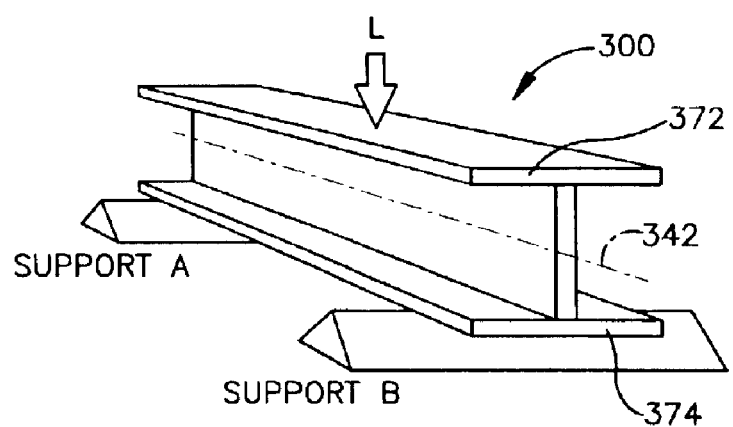

FIG. 2B shows a meridional cross-section of a portion of the tire of FIG. 2A, showing various dimensions, when inflated and unloaded;

FIG. 2C shows a meridional cross-section of a portion of the tire of FIG. 2A, showing various dimensions, when inflated and loaded;

FIG. 2D shows a meridional cross-section of a portion of the tire of FIG. 2A, showing the ply line and the tire outline as they would be both when loaded and when unloaded; and FIG. 3 shows an elongate structural beam resting on two supports.

DEFINITIONS

"Axial" and "axially" means the directions that are parallel to the tire axis.

"Bead" means an annular tensile member that is associated with holding the tire to the rim. The beads are wrapped by ply cords and shaped, with or without other reinforcement elements such as flippers, chippers, apexes or fillers, toe guards and chafers.

"Belt Structure" or "Belts" means at least two annular layers or plies of parallel cords, woven or unwoven, underlying the tread, unanchored to the bead, and having both left and right cord angles in the range from 17° to 27° with respect to the equatorial plane of the tire.

"Carcass" means the tire structure apart from the belt structure, tread and underlay over the plies, but including the beads.

"Carcass cord" means ply cord.

"Circumferential" means directions extending along the perimeter of the surface of the annular tread perpendicular to the axial direction.

"Cord" means one of the reinforcement strands of which the plies in the tire are comprised.

"Equatorial Plane" or "EP" means the plane perpendicular to the tire's axis of rotation and passing through the center of its tread.

"Lateral" means in the direction parallel with the tire axis

"Meridional" refers to a tire profile cut along a plane that includes the tire's rotational axis.

"Ply" means a layer of rubber-coated parallel cords.

"Radial" means in a direction orthogonal to the tire axis.

"Radial Ply Tire" means a belted or circumferentially-restricted pneumatic passenger or small truck tire in which at least one ply has cords which extend from bead to bead and are laid at cord angles between 65° and 90° with respect to the equatorial plane of the tire. The term tire within the context of the present invention excludes motorcycle tires.

"Shoulder" means the vertex where the sidewall meets the tread edge.

"Shoulder Region" means the upper portion of sidewall just below the tread edge. The shoulder region of a passenger or small truck tire has a cavity radius of up to 60 millimeters (mm). The shoulder region is the part of the tire under this cavity radius and between two planes perpendicular to the ply and passing through the borders of this cavity radius.

"Sidewall" is the portion of a tire between the tread and the bead.

"Loaded" used as an adjective for any parameter refers to that parameter for a tire that is loaded—i.e. inflated, mounted on a passenger or small truck, and resting on a surface. The tread profile of a passenger or small truck tire is generally flat in the loaded condition.

"Unloaded" used as an adjective for any parameter refers to that parameter for a tire that is unloaded—i.e. inflated and not resting on a surface. The tread profile of a passenger or small truck tire is generally flat in the unloaded condition.

DETAILED DESCRIPTION OF THE PREFERRED EMBODIMENT

Prior Art Construction

FIG. 1A shows a meridional cross-section of a prior art pneumatic radial tire 100 for a vehicle, such as an passenger or small truck, but excluding a motorcycle tire, showing its profile as it would be when inflated and not resting on a road surface ("unloaded"). The profile of the tread is generally a flat profile. The tire 100 has a tread 110, a belt structure ("belts") 112 comprising one or more belts, and a carcass 116. The carcass has two inextensible annular beads 120a, 120b, a radial ply 122 and two sidewalls 126a, 126b. The ply 122 passes near the tire's inner circumferential surface and is reinforced with high modulus synthetic carcass cords (not shown). The vertex (intersection point) where each sidewall 126a, 126b meets the edge of the tread 110 is a shoulder 128a, 128b, respectively. The axially-center, and radially outermost point of the tread 110 is a crown 114. The radially innermost points of the tire are toes 132a, 132b.

Prior Art in Unloaded Condition

FIG. 1B shows a meridional cross-section of a portion of the prior art passenger or small truck tire 100 of FIG. 1A, showing its profile as it would be when inflated and unloaded, and showing various dimensional specifications. The reference numbers correspond with those in FIG. 1A. For clarity, not all components shown in FIG. 1A are shown in FIG. 1B. While the following discussion is illustrated by FIG. 1B showing only half the tire profile, it should be understood that the explanation applies to the other half of the tire 100 as well. The tread profile is substantially flat.

The path of the ply 122 (ply line) as viewed in a meridional cross-section follows closely along the inner surface of tire 100, and the ply line near the shoulder 128A has a shoulder ply radius $R_{1U}$ (subscript "U" for "Unloaded"). The term "shoulder ply radius" is defined herein as the radius of curvature for points of the ply line that are nearby on both sides of the normal to the ply line that also passes through the shoulder (e.g. 128a). A shoulder drop $D_1$ is the radial distance between the crown 114 and the shoulder 128a. Section height $H_{1U}$ (subscript "U" for "unloaded") is the radial distance between the crown 114 and the toe 132a when unloaded. Tread width $TW_{1u}$ is the straight lateral distance between the shoulders 128a, 128b (only half the value is shown in FIG. 1B). Tread length $TL_2$ is the arc length of tread between the shoulders 128a, 128b (only half the value is shown in FIG. 1B). Sidewall height $SWH_{1U}$ is the radial distance between the shoulder 128a and the toe 132a.

The engineering principles for understanding the present invention rests on the following general principles regarding elongate structures under bending stress, as illustrated in FIG. 3. FIG. 3 shows an elongate structural beam 300 resting on two supports A and B at its two ends and under flexural (bending) stress from a load L at its center. The entire upper portion of the beam 300, including the top flange 372, is under compression, and the lower portion of the beam 300, including the bottom flange 374, is under tension. A neutral bending axis 342 is the boundary between the portion under compression and the portion under tension. There is no stress (either compression or tension) along the neutral bending axis 342.

An elongate structural member, such as the beam 300, has significant flexural rigidity only if both the material on the compression side has significant compressive modulus of elasticity ("modulus") and the material on the tension side has significant tensile modulus. An elongate structural member is stiffened when either the material of the compression side has increased compressive modulus or the material of the tension side has increased tensile modulus.

In the case of the prior art passenger or small vehicle tire, the ply is under tension at the shoulder while most of the rubber radially outward from the ply is in compression. This leads to high shoulder stiffness.

Prior Art Loaded Showing Tread-Lift

FIG. 1C shows a meridional cross-section of a portion of the prior art passenger or small vehicle tire 100 of FIGS. 1A and 1B, showing its profile as it would be when inflated and resting on a road surface 140 ("loaded condition"). The reference numbers correspond with those in FIGS. 1A and 1B. While the following discussion is illustrated by FIG. 1C showing only half the tire profile, it should be understood that the explanation applies to the other half of the tire 100 as well. The tread profile is still essentially flat (but with liftoff, as discussed below), as it was in the unloaded condition.

Section height $H_{1L}$ (subscript "L" for "Loaded") is the radial distance between the crown 114 and the toe 132*a* when loaded. When the tire is under a load of 50% and 90% of its rated load, at the rated inflation pressure of the tire, loaded section height $H_{1L}$ is typically 5% and 40%, respectively, lower than the unloaded section height $H_{1U}$ (see FIG. 1B), i.e. there is a 5% and 40% tire deflection, respectively.

Under the vehicle's load (see FIG. 1C), the sidewall 126*a* bulges outward, as illustrated by arrows 152,153. With the road surface 140 serving as a fulcrum against the shoulder 128*a*, the displacement indicated by arrow 153 causes the tread 110 to lift (through leverage) at the crown 114, as indicated by arrow 156. The path of the ply 122 (ply line) under the shoulder 128*a* has a radius $R_{1L}$ ("L" for "Load") which is larger than $R_{1U}$ (radius when unloaded; see FIG. 1B) because the shoulder area is under stress to flatten out.

The tread-lift degrades vehicle handling characteristics, especially in cornering, increases turning (steering) resistance, increases tread wear near the shoulders 128*a*, 128*b* and increases material fatigue under the tread 110 due to the cycling of the bending stresses, and hence shortens tire life. Tread-lift is a problem whether the crown 114 actually lifts off the ground or merely loses pressure against the ground, thus distributing the tire's load unevenly across the tread width.

In passenger and small truck tires in general, the problem of tread-lift is aggravated by an increase of ply cord modulus, heavy rubber gauge, sharp shoulder bend design, and deflation. Hence, tread-lift is aggravated by a thicker sidewall, thicker tread, and shorter tread contour radius near the shoulder. Tread-lift is also accentuated during lateral turning.

Referring to FIG. 1C, the inner area of the tire around the shoulder 128*a* is under tension (as illustrated by the letters "T"), and the outer area of the tire around the shoulder 128*a* is under compression (as illustrated by the letters "C"), with a neutral bending axis 142 in-between. Near the shoulder 128*a* and the tread 110, the high tensile modulus ply 122 is under tension, and the high compressive modulus rubber of the shoulder 128*a* and the tread 110 is under compression, and so, according to the loaded beam principle explained herein above, the ply functions with the rubber to stiffen the shoulder area and, therefore, contribute to tread-lift.

Within the sidewall 126*a*, the ply 122 does not contribute stiffness, because the ply is under compression and has no compressive strength. Also, the rubber within sidewall 126*a* (axially outside the ply 122) contributes little stiffness, because it is mainly under tension and has little tensile strength and is close to the neutral bending axis 142. Therefore, when the tire 100 is inflated and loaded, the sidewall 126*a* bends easily and the shoulder 128*a* and tread 110 bend little, resulting in tread-lift.

FIG. 1D shows meridional cross-section views of the tire 100 of FIGS. 1A–1C, showing the unloaded ply line 122U and the tire outline 100U as they would be while unloaded, and the loaded ply line 122L and tire outline 100L as they would be while loaded. For clarity, the other tire components are not shown. Note that the loaded ply line 122L has a loaded shoulder ply radius $R_{1L}$ that is larger (typically 50% larger) than the unloaded shoulder radius $R_{1U}$ of the unloaded ply line 122U. That is: $R_{1L} > R_{1U}$.

Preferred Embodiment

FIG. 2A shows a meridional cross-section of a pneumatic radial ply tire 200 for a passenger or small truck vehicle according to the present invention, showing its profile as it would be when inflated but not resting on a road surface ("unloaded"). The tire 200 has essentially the same components as the prior art, passenger or small truck tire 100. The tire 200 has a tread 210, a belt structure ("belts") 212 comprising one or more belts, and a carcass 216. The carcass 216 has two inextensible annular beads 220*a*, 220*b*, a radial ply 222 and two sidewalls 226*a*, 226*b*. The ply 222 passes near the tire's inner circumferential surface and is reinforced with high modulus synthetic carcass cords (not shown). The intersection point where each sidewall 226*a*, 226*b* meets the edge of the tread 210 is a shoulder 228*a*, 228*b*, respectively. The axially-center, and radially outermost, point of the tread 210 is a crown 214. The radially innermost points of the tire are toes 232*a*, 232*b*. To provide good durability in heavy handling, the tire 200 of the present embodiment has no circumferential decoupling grooves in the tread. Decoupling grooves are typically located in the tread at a distance of about 5 mm to about 30 mm from the shoulders 228*a*, 228*b*. As stated in the definitions, the "Shoulder" means the vertex where the sidewall meets the tread edge. Referring to the figures, the sidewalls extend generally radially, and the tread extends generally axially. As the sidewall nears the tread, it curves slightly inward towards the EP. As the tread nears the sidewall, it curves slightly inward towards the axis of rotation (not shown) (or towards the bead). Where the sidewall meets the tread, the change is abrupt. It is essentially a single point. However, in reality, it is not a sharp angle, but extends a few millimeters either way. That is why the shoulder is often discussed as a shoulder region, as defined in the definitions hereinbefore. That is, the shoulder region means the upper portion of sidewall just below the tread edge. The shoulder region of a passenger or small truck tire has a cavity radius of up to 60 mm. The shoulder region is the part of the tire under this cavity radius and between two planes perpendicular to the ply and passing through the borders of this cavity radius.

Preferred Embodiment of Tire Without Load

FIG. 2B shows a meridional cross-section of a portion of the passenger tire 200 of FIG. 2A of the present invention, showing its profile as it would be when inflated and unloaded, and showing various dimensional specifications. The reference numbers correspond with those in FIG. 2A. For clarity, not all components shown in FIG. 2A are shown in FIG. 2B. While the following discussion is illustrated by FIG. 2B showing only half the tire profile, it should be understood that the explanation applies to the other half of the tire 200 as well. The outline of the prior art passenger tire 100 (FIG. 1B) is shown in dashed line, to aid in discerning the differences in contour between the prior art passenger tire and the passenger tire 200 of the present invention.

The ply line (path of the ply 222) follows closely along the inner surface of tire 200, and the ply line near the shoulder 228a has an unloaded shoulder ply radius $R_{2U}$ (subscript "U" for "unloaded", subscript "2" for FIG. "2"), hereinafter called "radius". The unloaded shoulder ply radius is for points of the ply line that are nearby on both sides of the normal to the ply line that also passes through the shoulder. A shoulder drop $D_2$ is the radial distance between the crown 214 and the shoulder 228a. Section height $H_{2U}$ is the radial distance between the crown 214 and the toe 232a. Tread width $TW_{2U}$ is the unloaded straight lateral distance between the shoulders 228a, 228b (only half the value is shown in FIG. 2B). Tread length $TL_2$ is the arc length of tread between the shoulders 228a, 228b (see FIG. 2B). Sidewall height $SWH_{2U}$ is the radial distance between the shoulder 228a and the toe 232a of the tire 200 in the unloaded condition. The shoulder regions 229a, 229b of the passenger tire 200 are defined as the upper portion of the sidewalls 226a, 226b, respectively, just below the edge of tread 210. The passenger and small truck tires of the present invention are sized between 205/55R 15 for the smallest size and 285/35R 20 for the largest size. If the tire aspect ratio is smaller than 30 or greater than 55, the bead area at the rim flange level would be hardly solicited and may lead to a durability problem.

The passenger tire 200 of the present embodiment has essentially the same components as the prior art passenger tire 100, but differs from prior art tire 100 in contour and dimensions. The unloaded section height $H_{2U}$ of the present embodiment is the same as the unloaded section height $H_{1U}$ of the prior art. The unloaded tread width $TW_{2U}$ of the present embodiment is greater than the unloaded tread width $TW_{1U}$ of the prior art. The tread length $TL_2$ of the present embodiment is greater than the tread length $TL_1$ of the prior art passenger tire. The unloaded ply radius $R_{2U}$ of the present embodiment is larger than the unloaded shoulder ply radius $R_{1U}$ of the prior art by about 20% to 60%. The shoulder drop $D_2$ of the present invention is larger than the shoulder drop $D_1$ of the prior art passenger tire. Therefore, the unloaded sidewall height SWH the unloaded sidewall height $SWH_{1U}$ of the prior art passenger tire.

Stated in equation form: $H_{2U}=H_{1U}$; $TW_{2U}>TW_{1U}$; $TL_2>TL_1$; $R_{2U}>R_{1U}$; $D_2>D_1$; $SWH_{2U}<SWH_{1U}$.

Preferred Embodiment of Tire Under Load; No Tread-Lift

FIG. 2C shows a meridional cross-section of a portion of the passenger tire 200 (of FIG. 2B) of the present invention showing its profile as it would be when inflated and resting on a road surface 240 ("loaded"). The reference numbers correspond with those in FIG. 2B. While the following discussion is illustrated by FIG. 2C showing only half the tire profile, it should be understood that the explanation applies to the other half of the tire 200 as well.

Section height $H_{2L}$ ( subscript "L" for "loaded") is the radial distance between the crown 214 and the toe 232a. When the tire is under a load of 50%–90% of its rated load, and at the rated inflation pressure of the tire, loaded section height $H_{2L}$ is typically 5%–40%, respectively, lower than the unloaded section height $H_{2U}$ (see FIG. 1B), i.e. there is a 5%–40% tire deflection, respectively.

Under the vehicle's load, the sidewall 226a bulges outward, as illustrated by arrow 254, just like with the prior art tire 100. However, since tread length is longer in the present embodiment than in the prior art ($TL_2>TL_1$), which causes the shoulder 228a in the present embodiment to lie laterally farther out than the prior art shoulder 128a, and also since the sidewall is shorter in the present embodiment than in the prior art ($SWH_{2U}<SWH_{1U}$), the sidewall 226a and the tread 210 in the present invention meet at a sharper angle when loaded than when unloaded.

In other words, whereas the shoulder 128a of the prior art flattens out when loaded, the shoulder 228a of the present embodiment bends outward (i.e. bends more sharply) when loaded as illustrated by arrow 255. Note that the loaded shoulder ply radius $R_{2L}$ and an unloaded shoulder ply radius $R_{2U}$ for points of the ply line 242 that are nearby on both sides of the normal to the ply line also passes through the shoulder 228a.

Preferred Embodiment; Plies Do Not Contribute Rigidity at Shoulder

In the prior art passenger tire 100, the ply 122 stiffened the shoulder 128a to resist the bending stress to straighten out (to increase shoulder radius). In contrast, in the passenger tire 200 of the present embodiment, the ply 222 does not stiffen the shoulder 228a to resist the bending stress to bend outward (to decrease shoulder radius), for the following reason:

When the tire 200 is loaded (as shown in FIG. 2C), the shoulder 228a is under stress to bend outward (arrow 255). Therefore, around the shoulder 228a, the inner area is under compression (as illustrated by the letters "C"), and the outer area is under tension (as illustrated by the letters "T"), with a neutral bending axis 242 in-between. Hence, near the shoulder 228a, the ply 222 is under compression but has no compressive modulus, and the rubber is under tension but has negligible tensile modulus. Therefore, according to the loaded beam principle explained above, the ply 222 contributes negligible stiffness to the shoulder 228a and the rubber contributes negligible stiffness. Therefore, the shoulder 228a bends inward, thus eliminating the lever/fulcrum mechanism (described above) that produces tread-lift in the prior art passenger tire 100.

FIG. 2D shows meridional cross-section views of the tire 200 of FIGS. 2A–2C, showing the ply line 222U and the tire outline 200U as they would be while unloaded, and the ply line 222L and tire outline 200L as they would be while loaded. For clarity, the other tire components are not shown. The relationship between the shoulder ply radii $R_{1L}$, $R_{1U}$ of the loaded and unloaded prior art tire (FIG. 1D) is opposite to the relationship between the shoulder ply radii $R_{2L}$, $R_{2U}$ of the loaded and unloaded tire of the present invention (FIG. 2D). Whereas, in the prior art tire (FIG. 1D), $R_{1L}>R_{1U}$ in the tire of the present invention (FIG. 2D), $R_{2L}<R_{2U}$.

$R_{2L}$ should be 20%–80%, and preferably 40%–60%, shorter than $R_{2U}$. If $R_{2L}$ were too large (i.e. less than 20% shorter than $R_{2U}$), the tread-lift alleviation would be insignificant especially in cornering maneuver. If $R_{2L}$ were too short (i.e. over 80% shorter than $R_{2U}$), the footprint would be too sharply curved along the shoulder, reducing reliability and tire life. The tire carcass would also loss its lateral stiffness leading to a lack of cornering stability.

Preferred Embodiment Has No Tread-Lift Due to Better Ply Line

In summary, the unique contour of the passenger tire 200, according to the present invention, is less prone to tread-lift than the prior art passenger tire 100. The reduction in tread-lift yields more even distribution of pressure along the tread width, thereby reducing turning (steering) resistance, tread wear near the shoulders and material fatigue under the tread, and hence improving tire life. Also, the suppression of tread-lift obviates the need for a "decoupling groove" in the shoulder region of the sidewall, i.e., the upper portion of sidewall just below the tread edge, to reduce rigidity to alleviate tread-lift. The absence of a decoupling groove offers the advantage of higher tangential stiffness and better durability in heavy handling.

The passenger tires of the present invention has an essentially flat tread profile between the shoulders and including the shoulders to ensure contact all the time. The cupping effect of liftoff (which the present invention is alleviating) happens only on something which has a flat tread profile. It goes from flat to cupped. From more contact with the road, to less. By contrast, a motorcycle tire as disclosed the '761 patent, starts off with a round tread profile with very little road contact, then gets flat under load—creating more contact, not less. Accordingly, the liftoff issue of going from a flat profile to a cupped profile simply does not exist in motorcycle tire.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A radial ply tire having a tread, a belt structure, and a carcass comprising two sidewalls; two shoulders at vertexes where the tread meets the sidewall; two beads, and one or more plies following a meridional ply line, the one or more plies having a loaded shoulder ply radius and an unloaded shoulder ply radius for points of the ply line that are nearby on both sides of the normal to the ply line that also passes through the shoulder, the tire having a substantially flat tread profile such that the two shoulders generally simultaneously contact a load bearing surface when the tire is loaded, the tire comprising:

the loaded shoulder ply radius being 20% to 80% shorter than the unloaded shoulder ply radius.

2. The radial ply tire of claim 1 wherein the tire is free of decoupling grooves in the shoulder area of the tread.

3. The radial ply tire of claim 2 wherein the tire is free of decoupling grooves in the tread at a distance of about 5 mm to about 30 mm from the shoulders.

4. The radial ply tire of claim 1 wherein the loaded shoulder ply radius is 40% to 60% shorter than the unloaded shoulder ply radius.

* * * * *